Patented Oct. 8, 1935

2,016,617

UNITED STATES PATENT OFFICE 2,016,617

PROCESS FOR DECOMPOSITION OF HIGHLY POLYMERIZED CARBOHYDRATES

Hans Schlubach, Hamburg, Germany

No Drawing. Application July 16, 1931, Serial No. 551,301. In Germany July 17, 1930

15 Claims. (Cl. 260—10)

Numerous processes are known for the decomposition of highly polymerized carbohydrates, especially cellulose and starch.

Various processes used for this purpose which employ hydrogen chloride operate in the presence of water. Their disadvantages lie in the difficulty of removing the acid used after decomposition, as well as the property of the reaction products which are produced of making further use more difficult. Other processes make use of gaseous hydrochloric acid, but are carried out under ordinary pressure. Under these conditions it is not possible to obtain water-soluble products. According to the new process the various disadvantages of the hitherto known processes are avoided.

The invention consists in this that dry gaseous hydrochloric acid free from water is caused to act directly on the dry material under pressure. After the reaction is ended the hydrogen chloride gas is pumped off and after drying is used again.

The invention thus consists essentially in this that the dry gaseous hydrochloric acid is used under increased pressure. Any desired increased pressure may be employed for carrying out the invention. Amongst the many possible raised pressures under which the hydrogen chloride may be caused to act, certain definite pressures have been found advantageous. These advantageous raised pressures correspond to the actual saturation pressures of the hydrogen chloride. If the process is carried out at the actual saturation pressure of the hydrogen chloride, that is in the presence of liquefied hydrogen chloride as liquid phase, it is possible to effect the decomposition of carbohydrates of high molecular weight much more frequently and in a considerably shorter time than with pressures which are smaller than the saturation pressure of the hydrogen chloride corresponding to the temperature used. Thus, for instance, at a temperature of 22° C., for example, a hydrogen chloride pressure of 46 atms. is preferably used. With a higher or lower temperature the required optimum pressure is to be correspondingly raised or lowered in such a manner that liquid hydrogen chloride is always present as liquid phase, so that the corresponding saturation pressure is obtained. In this way it is possible to decompose carbohydrates of high molecular weight to a very great extent in an especially short time.

For carrying out the process according to the invention it is also important to regulate carefully the temperatures at which the compressed hydrogen chloride is allowed to act on the carbohydrates of high molecular weight. In general it is best to work at room temperature.

In particular the temperature needs to be checked when hydrogen chloride is compressed over the fresh carbohydrate material. When the hydrogen chloride is compressed over the material to be treated, considerable heat of reaction is evolved. This reaction heat may be so great that the material may be carbonized or at any rate may suffer a disadvantageous change. This reaction heat is undesired and must be avoided in order to obtain a satisfactory and useful decomposition of the highly polymerized carbohydrates according to the process.

This is achieved by the material to be treated before the actual decomposition with hydrogen chloride under raised pressure being preliminarily treated with hydrogen chloride at ordinary and/or moderately raised pressures. It has thus been found of advantage first to wash through the material to be treated with hydrogen chloride at ordinary pressure and to saturate it with hydrogen chloride. It may also be of advantage to carry out the washing with hydrogen chloride at a moderately raised pressure of, for example, a few atmospheres. The period and method of preliminary treatment is to be determined from case to case by tests in such a manner that in the subsequent treatment under raised pressure heat of reaction will not occur.

It may also be desirable to carry out the preliminary treatment with diluted hydrogen chloride, the hydrogen chloride being mixed with dry air, nitrogen or other gas.

The material which has been preliminarily treated according to the invention may now be subjected to the process, that is the treatment under high pressure with hydrogen chloride without any detrimental over-heating. In some cases the compression of the hydrogen chloride to the desired pressure may be effected gradually in different pressure stages.

In each case it is of advantage in order to improve the quality of the products, not to exceed temperatures of 100° C. in the preliminary treatment and in the main treatment and, if necessary, to operate at temperatures under 35° C. For the main treatment a temperature interval of 20 to 30° C. is found particularly advantageous. The invention is, however, in no way restricted to this temperature range.

According to the process described highly polymerized carbohydrates as, for example, cellulose, starch, cotton, linters, wood, straw and the like are treated and decomposed to a considerable extent. This decomposition clearly consists principally in a de-polymerization and splitting of the highly polymerized carbohydrates, while hydrolytic processes only play a subordinate part.

The product obtained in the decomposition of highly polymerized carbohydrates, such as, for example, cellulose, is a water-soluble dry powder which in contradistinction to the products obtained by the earlier processes can be used directly and without further purification.

The carbohydrates or carbohydrate-containing substances treated according to the invention may be used amongst other things as a valuable cattle fodder, since after being decomposed according to the invention, they can immediately be taken up and digested by the animal organism. The decomposed starch is used as dextrin for pastes and similar purposes. After the usual further treatment (for example, acetylation or nitration) the decomposition products may be employed as basic materials for the varnish and explosive industries.

*Example 1*

In an autoclave of material which is resistant to hydrochloric acid is air-dried cellulose. The dry hydrochloric acid gas is either forced into the autoclave by a compressor to a pressure of about 40 atms. or by suitable cooling is condensed in the autoclave itself. The vapour pressure of the water-free liquid hydrogen chloride at 22° C. is 45.75 atms. For the decomposition of cellulose, however, the liquid water-free hydrogen chloride is not necessary, the gas under pressure is sufficient. After being allowed to act for about a day the hydrogen chloride is pumped off as completely as possible, heat being applied, and after drying can immediately be used in a second autoclave.

After the last traces of acid gas have been removed by treatment with a stream of gas, for example, dry air, carbonic acid and the like and finally with bases, the decomposition product is a dry water-soluble powder which is suitable for immediate further treatment. When wood, straw and the like are used as starting material the decomposed part can be separated from the part which is not decomposed by washing out with water.

The treatment according to the invention makes the cellulose up to 100% water soluble.

If, on the other hand, the same cellulose is treated under exactly the same conditions except that gaseous hydrogen chloride is used at ordinary pressure, the cellulose is practically unchanged and remains completely insoluble in water.

*Example 2*

Ordinary well-dried potato starch is subjected to the action of gaseous anhydrous hydrochloric acid under the same conditions as described for cellulose and is similarly treated. The result is a dry powder which is at once soluble in water and shows a rotation of about 85° C.

What I claim is:

1. A process for decomposing material comprised of highly polymerized carbohydrates, comprising the steps of treating said material in the dry state with dry gaseous hydrogen chloride under the saturation pressure of this substance at the prevailing temperature, i. e. in the presence of liquid hydrogen chloride.

2. A process for decomposing material comprised of highly polymerized carbohydrates, comprising the steps of first treating the said material in the dry state with pure gaseous hydrogen chloride at a pressure selected from a pressure range commencing with, and extending moderately beyond, atmospheric pressure, and then treating the material with dry gaseous hydrogen chloride under considerably elevated pressure.

3. A process for decomposing material comprised of highly polymerized carbohydrates, comprising the steps of first treating the said material in the dry state with pure gaseous hydrogen chloride at a pressure selected from a pressure range commencing with, and extending moderately beyond, atmospheric pressure, and then treating the material with dry gaseous hydrogen chloride under the saturation pressure of this substance at the prevailing temperature, i. e. in the presence of liquid hydrogen chloride.

4. A process for decomposing material comprised of highly polymerized carbohydrates, comprising the steps of first treating the said material in the dry state with pure gaseous hydrogen chloride diluted with an inert gas at a pressure selected from a pressure range commencing with, and extending moderately beyond, atmospheric pressure, and then treating the material with dry gaseous hydrogen chloride under considerably elevated pressure.

5. A process for decomposing material comprised of highly polymerized carbohydrates, comprising the steps of first treating the said material in the dry state with pure gaseous hydrogen chloride diluted with an inert gas at a pressure selected from a pressure range commencing with, and extending moderately beyond, atmospheric pressure, and then treating the material with dry gaseous hydrogen chloride under the saturation pressure of this substance at the prevailing temperature, i. e. in the presence of liquid hydrogen chloride.

6. A process for decomposing material comprised of highly polymerized carbohydrates, comprising the steps of first treating the said material in the dry state with pure gaseous hydrogen chloride diluted with dry air at a pressure selected from a pressure range commencing with, and extending moderately beyond, atmospheric pressure, and then treating the material with dry gaseous hydrogen chloride under considerably elevated pressure.

7. A process for decomposing material comprised of highly polymerized carbohydrates, comprising the steps of first treating the said material in the dry state with pure gaseous hydrogen chloride diluted with dry nitrogen at a pressure selected from a pressure range commencing with, and extending moderately beyond, atmospheric pressure, and then treating the material with dry gaseous hydrogen chloride under considerably elevated pressure.

8. A process for decomposing material comprised of highly polymerized carbohydrates, comprising the steps of first treating the said material in the dry state with pure gaseous hydrogen chloride diluted with dry air at a pressure selected from a pressure range commencing with, and extending moderately beyond, atmospheric pressure, and then treating the material with dry gaseous hydrogen chloride under the saturation pressure of this substance at the prevailing temperature, i. e. in the presence of liquid hydrogen chloride.

9. A process for decomposing material comprised of highly polymerized carbohydrates, comprising the steps of first treating the said material in the dry state with pure gaseous hydrogen chloride diluted with dry nitrogen at a pressure selected from a pressure range commencing with, and extending moderately beyond, atmospheric pressure, and then treating the material with dry gaseous hydrogen chloride under the saturation pressure of this substance at the prevailing temperature, i. e. in the presence of liquid hydrogen chloride.

10. A process for decomposing material comprised of highly polymerized carbohydrates, comprising the steps of treating said material in the dry state with dry gaseous hydrogen chloride under raised pressure and at a temperature which does not exceed 100° C.

11. A process for decomposing material comprised of highly polymerized carbohydrates, comprising the steps of treating said material in the dry state with dry gaseous hydrogen chloride under raised pressure and at a temperature which does not exceed 35° C.

12. A process for decomposing material comprised of highly polymerized carbohydrates, comprising the steps of first treating the said material in the dry state with pure gaseous hydrogen chloride at a pressure selected from a pressure range commencing with, and extending moderately beyond, atmospheric pressure, and then treating the material with dry gaseous hydrogen chloride under considerably elevated pressure and at a temperature which does not exceed 100° C.

13. A process for decomposing material comprised of highly polymerized carbohydrates, comprising the steps of first treating the said material in the dry state with pure gaseous hydrogen chloride at a pressure selected from a pressure range commencing with, and extending moderately beyond, atmospheric pressure, and then treating the material with dry gaseous hydrogen chloride under considerably elevated pressure and at a temperature which does not exceed 35° C.

14. A process for decomposing material comprised of highly polymerized carbohydrates, comprising the steps of first treating the said material in the dry state with pure gaseous hydrogen chloride diluted with an inert gas at a pressure selected from a pressure range commencing with, and extending moderately beyond, atmospheric pressure, and then treating the material with dry gaseous hydrogen chloride under considerably elevated pressure and at a temperature which does not exceed 100° C.

15. A process for decomposing material comprised of highly polymerized carbohydrates comprising the steps of first passing through the said material in the dry state pure gaseous hydrogen chloride at a pressure selected from a pressure range commencing with, and extending moderately beyond, atmospheric pressure, and then treating the material with dry gaseous hydrogen chloride under considerably elevated pressure.

HANS SCHLUBACH.